July 18, 1967     W. G. EKDAHL     3,331,668
APPARATUS FOR FORMING FIBROUS PRODUCTS
Filed Sept. 9, 1964
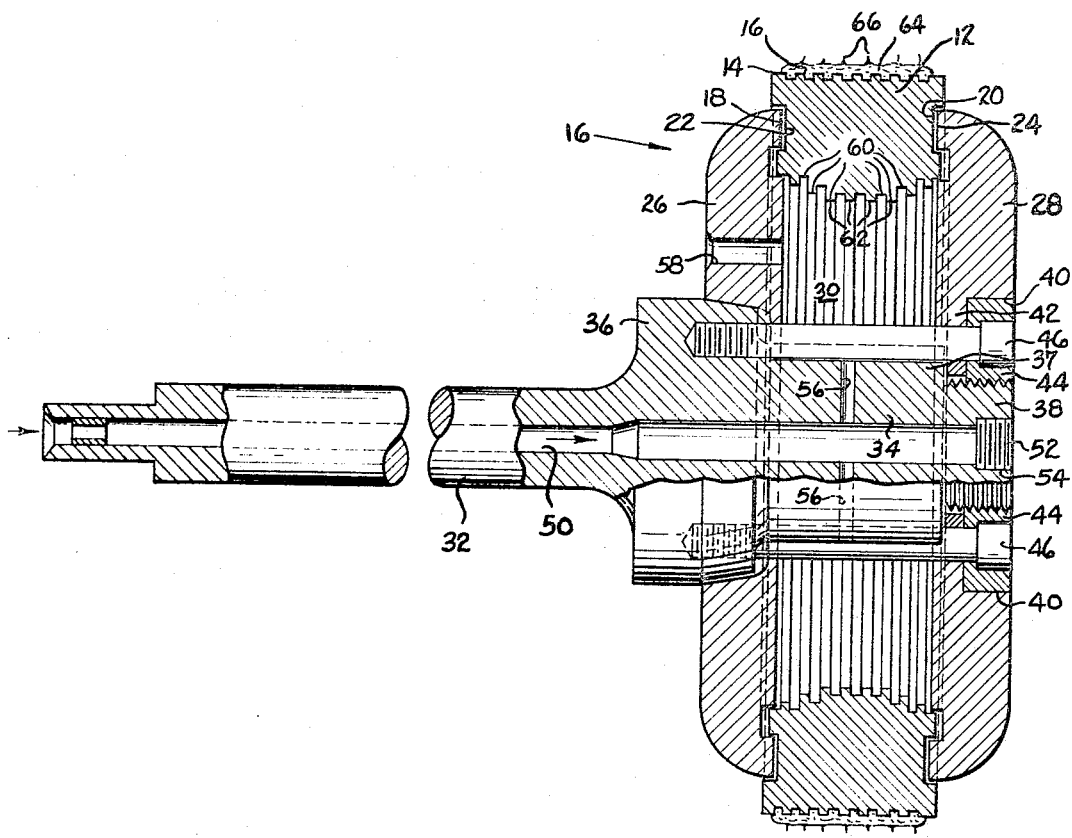
INVENTOR.
WENDELL G. EKDAHL
BY
*John A. McKinney*
ATTORNEY

United States Patent Office 3,331,668
Patented July 18, 1967

3,331,668
APPARATUS FOR FORMING FIBROUS PRODUCTS
Wendell Graydon Ekdahl, Plainfield, N.J., assignor to Johns-Manville Corporation, New York, N.Y., a corporation of New York
Filed Sept. 9, 1964, Ser. No. 395,240
4 Claims. (Cl. 65—1)

This invention relates to apparatus for use in rotary systems of fiberization of the type wherein a molten material is bonded to the peripheral surface of a rotor and fibers are formed from this molten material by the high speed rotation of the rotor so as to cause globules of the molten material to be flung off the rotor and to pull off with them fibers of the molten material. In particular, the invention is directed to the construction of a tire for such a rotor and specifically of a tire for a hollow type of rotor. Although the apparatus of this inevntion is particularly directed for use with high temperature refractory fiber melts, it may be advantageously utilized to produce other fibrous products such as those formed from slag, rock, glass, mixtures thereof, and other heat liquefiable materials which may be drawn out into fibrous form.

In the formation of the fibrous material in a rotary system of fiberization as described above, difficulties have been encountered in prolonging the operational life of the tire for the rotor. These difficulties are especially serious when the system is being utilized to make refractory fibers because of the relatively high temperatures of the molten material which for conventional refractory fibers exceeds 3000° F. These tires, and therefore the rotors, fail in such service due to expansion resulting from accelerated deterioration of their mechanical strength properties caused in part by the high temperature imposed by the molten material to be fiberized. This problem defies a simple solution since these tires cannot be maintained at too low a temperature by supplying them with a large amount of coolant since the tires must have a temperature high enough so as not to chill the molten material. If the temperature of the rotor is maintained too low, coarse fibers will be formed from the molten material and low production rates will prevail.

It is an object of the instant invention to provide a rotor tire which resists deterioration of its mechanical strength properties for an extended period of time.

The foregoing and other objects are accomplished in accordance with the instant invention by a rotor tire having increased mechanical strength and more effective cooling. The rotor tire made in accordance with the instant invention is generally annular in form and, in the preferred embodiment of the invention, the outer peripheral surface thereof is provided with a plurality of grooves to maintain the molten material therein. The inner peripheral surface of the cross-sectional configuration of the tire in an axial direction is generally arcuate so as to have varying inside diameters throughout its axial extent with the smallest diameters being generally at the mid point axially of the tire. In the preferred embodiment of the invention, this inner peripheral surface of the rotor tire comprises a plurality of adjacent sections each of which extends radially inwardly from the tire and has a generally cylindrical inner surface and wherein the inner diameter of each section differs from the inner diameter of the section on either axial side thereof with the sections of the smallest diameter being located in an axial direction generally centrally to the rotor tire. Therefore, the rotor tire of the instant invention has its greatest radial thickness located approximately at its axially central section and, in this manner, the mechanical strength properties of the rotor tires are substantially increased. Also, by forming the inner peripheral surface as described above, the inner peripheral surface of the rotor tire is provided essentially with a plurality of flutes or grooves so as to provide a large surface area in contact with the cooling media. Thus, effective and readily controllable cooling is acomplished with a minimum of coolant and there is no necessity to jeopardize fiberization by having to maintain the tire at too low a temperature. In this manner, the rotor tire of the instant invention provides maximum resistance against deterioration of its mechanical strength properties for a long period of time.

The invention will be more fully understood and further objects and advantages thereof will become apparent when reference is made to the following detailed description of a preferred embodiment of the invention and the accompanying drawing which is a sectional view with parts in elevation of apparatus of the instant invention.

Referring to the drawing, there is shown a rotor indicated generally at 10 of the type illustrated in U.S. Patent No. 2,529,962 to Powell. The rotor includes a tire 12 made of steel or alloys relatively resistant to high temperature such as chromium-nickel-iron alloys, chrome-molybdenum-iron alloys, and the like. The tire has an outer annular surface 14 adapted to receive the molten material, which in the preferred embodiment of the invention comprises a refractory fiber melt, and for that purpose, the annular surface may be provided with grooves 16 or other surface indentations of suitable shape to retain the molten material in the form of annular rings. The tire 12 is provided with annular grooves 18 and 20 in its side faces for receiving the flanges 22 and 24 of the end plates 26 and 28 respectively. The end plates and tire cooperate to define a hollow interior section 30.

The rotor, comprising the end plates and the tire, is supported on a shaft 32 adapted to be mounted in suitable bearings for rotation at high speed. The bearing structure and driving means form no part of the instant invention and hence have not been shown. The shaft includes a hub 34 including an enlarged boss 36, a cylindrical section 37 and a threaded end 38 of reduced diameter. End plate 26 has a central aperture shaped to fit against boss 36, and end plate 28 is provided with a recessed central portion 40 defining a flange 42 fitting around the threaded end 38 of the hub and engaging section 37. The tire 12 and end plates 26 and 28 are held in assembled relationship on the shaft by a threaded collar 44 fitting recess 40 and screwed onto the end 38 of the shaft to overlie flange 42, and also by studs 46 extending through aligned openings in the several parts and threaded into boss 36.

Shaft 32 is provided with a center bore 50 extending the length of the shaft with its forward end closed by plug 52 threaded into a socket 54. Ducts or bores 56 extend radially outwardly from the bore 50 of shaft 32, the ducts passing through the hub 34 to the hollow inner section 30. One or more vents 58 are provided in one of the end plates, suitably plate 26 defining the rear side of the rotor, the vents extending axially through the plate between tire 12 and the hub 34.

The cross-sectional configuration of the tire 12 of the instant invention is provided with an inner peripheral surface which in an axial direction is substantially arcuate so as to have varying inside diameters throughout its axial extent with the smallest diameters being located generally at the mid section axially of the tire. As shown in the drawing, the arcuate shape is accomplished in the preferred embodiment of the invention by shaping the inner peripheral surface of the tire 12 as a plurality of sections 60 extending radially inwardly from the tire and having generally cylindrical inner surfaces and wherein the inner diameter of each section differs from the inner diameter of the section on either axial side thereof. The sections 62, having the smallest inside diameters, are located in an axial direction generally centrally of the tire 12.

The rotor construction described above may be used with a rotary system of fiberization of the type illustrated in U.S. Patent 2,428,810 to E. R. Powell. Each rotor is supported on a substantially horizontal axis for rotation at high speed and the molten material, which in the preferred embodiment of the invention comprises a refractory fiber melt and may be at a temperature in excess of 3000° F., is continuously discharged onto the rotor surface to form a relatively permanent bonded ring 64, the fibers being drawn out from surface portions of the ring as indicated at 66. In order to conduct away the excess heat imparted to the rotor by the molten material and maintain the rotor tire at the desired temperature for maximum efficiency, say 600–900° F., a vaporizable liquid preferably water, is introduced in controlled quantities to the bore 50 of shaft 32 from any suitable source, not shown. The water passes through the bore and enters ducts 56 which conduct it directly to the inner cavity 30 and then to the inner surface of tire 12. Movement of the water through the ducts is accelerated by the centrifugal forces set up by the rotation of the rotor. Relatively small quantities of water are employed so that when the water reaches the tire, it is immediately vaporized, the heat of vaporization being drawn from the tire. The water vapor or steam may readily escape through openings 58.

The construction of the inner peripheral surface of the tire 12 as a plurality of sections having inner generally cylindrical surfaces of varying diameters allows for the formation of a greater surface area over the same axial extent to allow for more effective cooling. This means that it is not necessary to keep the temperature of the tire at a temperature which might interfere with the fiberization efficiency of the tire by the use of excessive coolant. Also, the temperature of the tire can be readily maintained at the desired level with a minimum of coolant. The arcuate shape of the inner peripheral surface imparts additional mechanical strength to the tire, so that the tire has greater resistance against deterioration of its mechanical strength properties due to the high temperature imposed by the molten material. Although the exact reason or reasons are not specifically known, tires made in accordance with the instant application have been used for periods of time at least four times greater than conventional tires. Also, it is noted that tires having a radial thickness equal to the greatest radial thickness of the tires made in accordance with the instant invention but without the arcuate shape in the axial direction will not be as effective and will add an undue burden on the rest of the equipment.

While the invention has been described in rather full detail, it will be understood that these details need not be strictly adhered to and that various changes and modifications may suggest themselves to one skilled in the art, all falling within the scope of the invention as defined by the subjoined claims.

What I claim:

1. In a rotary system of fiberization wherein a molten material at high temperature is bonded to the peripheral surface of the tire of a rotor and fibers are formed from this molten material by the high speed of rotation of the rotor so as to cause globules of the molten material to be flung off and to pull off with them fibers of the molten material and wherein the tire forms a part of a hollow rotor, the improvement comprising a rotor tire which resists deterioration of its mechanical strength properties for an extended period of time, said tire comprising:
    (a) a substantially annular body comprising a highly heat resistant material extending in an axial direction for a predetermined distance,
    (b) an outer peripheral surface on said body on which the material to be fiberized may be retained,
    (c) the cross-sectional configuration of said body having an inner peripheral surface which in an axial direction is generally arcuate so as to provide said body in its axial extent with portions of varying inner diameter, and
    (d) said portions of said inner peripheral surface of smallest diameters being located in an axial direction generally centrally of said tire.

2. In a rotary system of fiberization wherein a molten material at high temperature is bonded to the peripheral surface of the tire of a rotor and fibers are formed from this molten material by the high speed of rotation of the rotor so as to cause globules of the molten material to be flung off and to pull off with them fibers of the molten material and wherein the tire forms a part of a hollow rotor, the improvement comprising a rotor tire which resists deterioration of its mechanical strength properties for an extended period of time, said tire comprising:
    (a) a substantially annular body comprising a highly heat resistant material extending in an axial direction for a predetermined distance,
    (b) an outer peripheral surface on said body on which the material to be fiberized may be retained,
    (c) the cross-sectional configuration of said body having an inner peripheral surface which in an axial direction is generally arcuate and is defined by a plurality of sections extending radially inwardly from said body,
    (d) each of said sections having a generally cylindrical inner surface,
    (e) each of said sections having an inner diameter differing from the inner diameter of the sections located on either axial side thereof, and
    (f) said sections having the smallest inner diameters being located in an axial direction generally centrally of said tire.

3. In a rotary system of fiberization wherein a molten material at high temperature is bonded to the peripheral surface of the tire of a rotor and fibers are formed from this molten material by the high speed of rotation of the rotor so as to cause globules of the molten material to be flung off and to pull off with them fibers of the molten material and wherein the tire forms a part of a hollow rotor, the improvement comprising a rotor tire which resists deterioration of its mechanical strength properties for an extended period of time, said tire comprising:
    (a) a substantially annular body comprising a highly heat resistant material extending in an axial direction for a predetermined distance,
    (b) an outer peripheral surface on said body on which the material to be fiberized may be retained,
    (c) the cross-sectional configuration of said body having an inner peripheral surface which in an axial direction is generally arcuate and is defined by a plurality of sections extending radially inwardly from said body,
    (d) each of said sections having a generally cylindrical inner surface,
    (e) each of said sections having an inner diameter differing from the inner diameter of the sections located on either axial side thereof,
    (f) said sections having the smallest diameters being located in an axial direction generally centrally of said tire, and
    (g) each of said sections being of substantially equal axial extent.

4. In a rotary system of fiberization wherein a molten material at high temperature is bonded to the peripheral surface of the tire of a rotor and fibers are formed from this molten material by the high speed of rotation of the rotor so as to cause globules of the molten material to be flung off and to pull off with them fibers of the molten material and wherein the tire forms a part of a hollow rotor, the improvement comprising a rotor tire which resists deterioration of its mechanical strength properties for an extended period of time, said tire comprising:
    (a) a substantially annular body comprising a highly heat resistant material extending in an axial direction for a predetermined distance, (b) an outer peripheral surface on said body on which the material to be fiberized may be retained, (c) the cross-sectional configuration of said body having an inner peripheral surface which in an axial direction is generally arcuate and is defined by a plurality of sections extending radially inwardly from said body, (d) each of said sections having a generally cylindrical inner surface, (e) each of said sections having an inner diameter differing from the inner diameter of the sections located on either axial side thereof, (f) said sections having the smallest inner diameters being located in an axial direction generally centrally of said tire, (g) each of said sections being of substantially equal axial extent, and (h) a plurality of said sections having the same inner diameter.

References Cited

UNITED STATES PATENTS

| | | | |
|---|---|---|---|
| 2,529,962 | 11/1950 | Powell | 65—8 |
| 2,648,369 | 8/1953 | Todd | 152—158 X |

DONALL H. SYLVESTER, *Primary Examiner.*

R. LINDSAY, *Assistant Examiner.*